July 19, 1966            T. J. KAARIO            3,261,419
SYSTEM FOR CONTROLLING ALTITUDE AND PITCH IN A
GROUND EFFECT VEHICLE
Filed Nov. 29, 1962
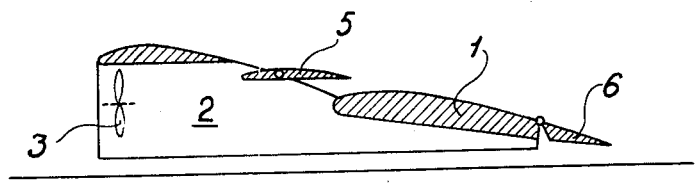
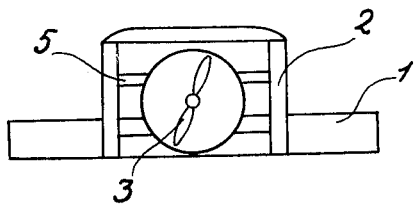

United States Patent Office 3,261,419
Patented July 19, 1966

3,261,419
SYSTEM FOR CONTROLLING ALTITUDE AND PITCH IN A GROUND EFFECT VEHICLE
Toivo Juhani Kaario, Linnavuori, Finland
Filed Nov. 29, 1962, Ser. No. 240,985
Claims priority, application Finland, Sept 4, 1959, 1,404/59, Patent 33,611
1 Claim. (Cl. 180—7)

This invention relates to a mechanical system for controlling altitude and pitch attitude in a ground effect vehicle.

This application is a continuation-in-part of my application Serial No. 52,871, filed Aug. 30, 1960, now abandoned for Arrangement for Regulating the Operational Altitude and Position of a Ground Effect Vehicle.

Some ground effect machines are composed of a wing beneath which air pressure is built up by ram effect of the moving vehicle or by a blower. When such ground effect machine is operating without contact with the surface along which it moves, the air passing beneath the wing, through the blower or through some opening by ram effect, passes through the gap existing between the wing and the surface. The pressure in the chamber formed by the wing and surface is established not only by the power used, but also by reason of the difference in size of the openings for the flow inward and for the flow outward. A stable altitude of the vehicle is thus established. There are various more or less known and evident means for regulating the amount of the incoming air. The power of the blower or the area of the opening or channel leading to the chamber beneath the wing can be regulated. One other method is by regulating the area of an opening which leads air away from the chamber. In this case it is preferred to use the said air to aid the forward propulsion of the craft by leading such air flow backward.

Experience has shown that the wing, when correctly formed, will be stable in pitch and roll attitudes. Although this phenomenon is of basic importance for the successful operation of a ground effect machine, it is only mentioned here for better understanding without any more detailed description, because the means for achieving a satisfactory stability are not directly included in the claimed subject matter of this invention.

Having now explained some aspects of the functioning of the ground effect machines, especially the fundamentals of the altitude control I will describe some proper designs for achieving the said control.

At supercritical speed, when the dynamic pressure of the ambient airstream is greater than the pressure beneath the wing, one natural intake is the front gap between the wing and surface. All forward facing openings will increase the drag of the craft; such drag is increased when such openings are closed at their back ends. But the chamber beneath the wing of a ground effect machine is not generally closed. The outlet area is directly proportional to the altitude. The altitude is thus proportional to the area of the ram inlet. The altitude must be kept at the practical minimum for avoiding the momentum drag brought about by air escaping from the side gaps, and for this purpose it is proper to make the ram intake controllable.

In the accompanying drawings:

FIG. 1 is a view in vertical longitudinal section of a preferred illustrative embodiment of ground effect vehicle in accordance with the invention; and FIG. 2 is a view in front elevation of the ground effect vehicle shown in FIG. 1.

In the smaller ground effect machines the intake system with a forward facing intake forms an appreciable superstructure built on the wing. In these the most practical way to combine the altitude control and to provide for the proper flow condition around the intake for achieving the minimum drag is to divide the incoming air into two regulated parts one passing beneath the wing and the other going direct through the blower or intake tunnel backwards over the wing. The former part is used for lift and propulsion also, when the craft is moving forward, and the latter part is used for propulsion only and for stabilizing the flow around the intake superstructure.

In FIGS. 1 and 2 the system of the invention is shown in its simplest form. The tunnel 2 is built above the wing 1. The flap 5 divides the air from the blower 3 into the two parts mentioned, and the altitude of the vehicle is thus regulated by the power of the blower and by the flap. Several flaps can also be used in the place of this simple form.

Having now described methods of the altitude control I will explain the method for the pitch control. The forces for this purpose are derived by regulating the pressure distribution beneath the wing. When the vehicle is in motion the most effective part of the wing for the control of the pitch of the vehicle is the rear part. The pressure distribution is established by the form of the more or less open chamber formed by the rear part of the wing and by the surface over which the vehicle is moving. If the channel for the rearward air flow is altered in cross sectional area, this will obviously alter the pressure distribution also. If there is some throttling in the flow of air escaping from the chamber, there will be an increase of the pressure in front of the location of such throttling. One way to effect this forming of the channel is by use of a flap 6, FIG. 1, hinged at the trailing edge of the wing 1. Obviously this flap or other similar configurations which may be used for altering the form of the channel formed by the rear part of the wing and the surface over which the vehicle is traveling may also be positioned at convenient places other than the trailing edge of the wing. The flap can be situated on the wing a short distance upstream of the trailing end of the wing.

Having now described a preferred embodiment of the designs for controlling the altitude and pitch attitude of a ground effect machine and the underlying principles I have invented, I claim as new the following:

In a ground effect vehicle having a single load bearing wing, a mechanical system for controlling the altitude and pitch attitude of the vehicle, said system comprising as a first principal component a tunnel on the front and lateral middle part of the wing, said tunnel forming with the operating surface over which the vehicle passes a more or less closed chamber, the said tunnel being composed of a forward open intake, a passage leading from the tunnel beneath the front part of the said wing, a rearwardly open exhaust port in the rear end of the said tunnel, a blower means mounted on the vehicle for impelling a stream of air rearwardly through the tunnel from the forward open intake thereof, a first flap cooperating with the exhaust port and operated by the controls of a pilot, said first flap being operable adjustably to close the said exhaust port, and, as a second principal component of the system, a second adjustable flap adapted to be operated by the controls of a pilot and located on the trailing end of the said wing, said second flap regulating the backward directed convergence of the channel formed of the bottom and rear part of the said wing and operating surface.

References Cited by the Examiner

UNITED STATES PATENTS

| | | |
|---|---|---|
| 1,819,216 | 8/1931 | Warner. |
| 2,364,676 | 12/1944 | Warner. |
| 2,387,627 | 10/1945 | Warner. |
| 2,444,318 | 6/1948 | Warner. |

FOREIGN PATENTS

| | | |
|---|---|---|
| 26,122 | 11/1953 | Finland. |
| 1,266,804 | 6/1961 | France. |

OTHER REFERENCES

Symposium on Ground Effect Phenomenon presented in October 1959 at Princeton University, pages 261 and 262.

PHILIP ARNOLD, Examiner.

A. HARRY LEVY, Primary Examiner.

R. M. WOHLFARTH, Assistant Examiner.